United States Patent

[11] 3,559,941

| [72] | Inventor | James W. Holzman |
| | | Grosse Ile, Mich. |
| [21] | Appl. No. | 762,848 |
| [22] | Filed | Sept. 26, 1968 |
| [45] | Patented | Feb. 2, 1971 |
| [73] | Assignee | Dana Corporation |
| | | Toledo, Ohio |
| | | a corporation of Virginia |

[54] MOUNTING DEVICE
3 Claims, 3 Drawing Figs.

| [52] | U.S. Cl. | 248/228, 24/19, 248/231 |
| [51] | Int. Cl. | B65d 63/08 |
| [50] | Field of Search | 248/226, 228, 229, 230, 231, 70, 72, 74, 74PB; 24/19 |

[56] References Cited

UNITED STATES PATENTS

| 1,907,889 | 5/1933 | Stauffer | 24/19 |
| 2,491,673 | 12/1949 | Lytle | 24/19 |
| 2,634,939 | 4/1953 | Voss | 248/231 |
| 2,883,135 | 4/1959 | Smalley | 248/230 |
| 3,226,069 | 12/1965 | Clarke | 248/74 |
| 3,241,800 | 3/1966 | Richter | 248/231 |

FOREIGN PATENTS

| 326,895 | 3/1930 | Great Britain | 248/229 |
| 637,916 | 2/1928 | France | 248/74 |

*Primary Examiner*—Marion Parsons, Jr.
*Attorneys*—Walter E. Pavlick, Harold D. Shall and Robert A. Jensen ABSTRACT: A mounting assembly for securing a measuring device requiring a specific orientation to a variety of structures. The device includes a pair of adjustable, spaced mounting blocks, secured to a base plate, which are adapted to conform to a variety of supporting shapes. Serrations on the hardened steel mounting blocks provide secure placement when the assembly is clamped to the supporting structure. The combination of an angled bracket including appropriately placed arcuate slots provide even greater versatility in orienting the device.

MOUNTING DEVICE

BACKGROUND OF THE INVENTION

In the manufacture of automobiles, trucks and other structures which are subjected to varied stress and strain while in use, it is the practice to test the structures, determining their ability to withstand forces expected to be presented thereto, prior to going into commercial production. The stresses are generally measured by securing a transducer to some portion of the structure and then either stressing the structure in an apparatus simulating the forces expected or placing the instrument upon a vehicle undergoing actual test runs.

Since the instruments used are generally designed to measure force in a single direction to the exclusion of others, the placement of the instrument is critical. It is obvious, taking a car undercarriage for example, that the instrument cannot be placed upon a support structure of the same shape in each instance since stresses measured at varying portions of the structure as well as in different directions are necessary to generate a complete picture. A problem in the industry has been in finding a suitable mounting device which is readily adaptable to the variety of sizes and shapes of structures to which the instrument must be secured. Because of the rapid increase in labor cost, it is critical that the device be readily attached and detached by a person of average mechanical skill.

It is to be noted that since generally an instrument such as a transducer will measure forces in only one direction; i.e., that of interest to the particular examination, it must be mounted with a specific orientation and so the ease with which the instrument orientation can be changed is likewise of importance.

With the above noted problems in mind, it is an object of the present invention to provide a suitable mount for a measuring instrument which is readily adaptable for securing the instrument to a variety of supporting structures.

In accordance with this object and as a feature of the present invention a simple mounting device has been developed which not only is readily adaptable to a variety of structures but allows a large variation in orientation of a transducer mounted thereon.

Another object of this invention is to provide a mounting assembly which may be readily secured to a variety of supporting structures and yet will remain in the predetermined orientation through a plurality of accelerations and/or other forces.

In accordance with this object and as a feature of this invention, the mounting assembly includes a pair of hardened serrated metal blocks having adjustable spacing which are adapted to bite into the supporting structure, thus providing a secure base for the measuring instrument.

The above and other objects, features and advantages of the present invention will be apparent to those skilled in the art from a reading of the following detailed description of the invention taken in conjunction with the accompanying drawings.

It is to be noted that the particular embodiments and uses shown are for illustrative purposes only and that the clamping device could equally well be used to clamp structures or instruments to any appropriate framework.

BRIEF DESCRIPTION OF THE DRAWINGS

Referring now to FIG. 1, there can be seen a graphical representation of a transducer; in this case shown as an accelerometer, 2 having a base 4 and a suitable electrical connector 6. The base of the transducer 2 is secured by screws to one leg of a right angle member 8, an optional part of the mounting device, which has a plurality of arcuate slots 10 in its other leg. The leg containing the arcuate slots 10 is secured to a base member 12 by means of a plurality of screws 13, the arcuate slots allowing for a variety of orientations of the angle member 8 with respect to base member 10 and thus a variety of orientations of the transducer itself.

Figure 1:
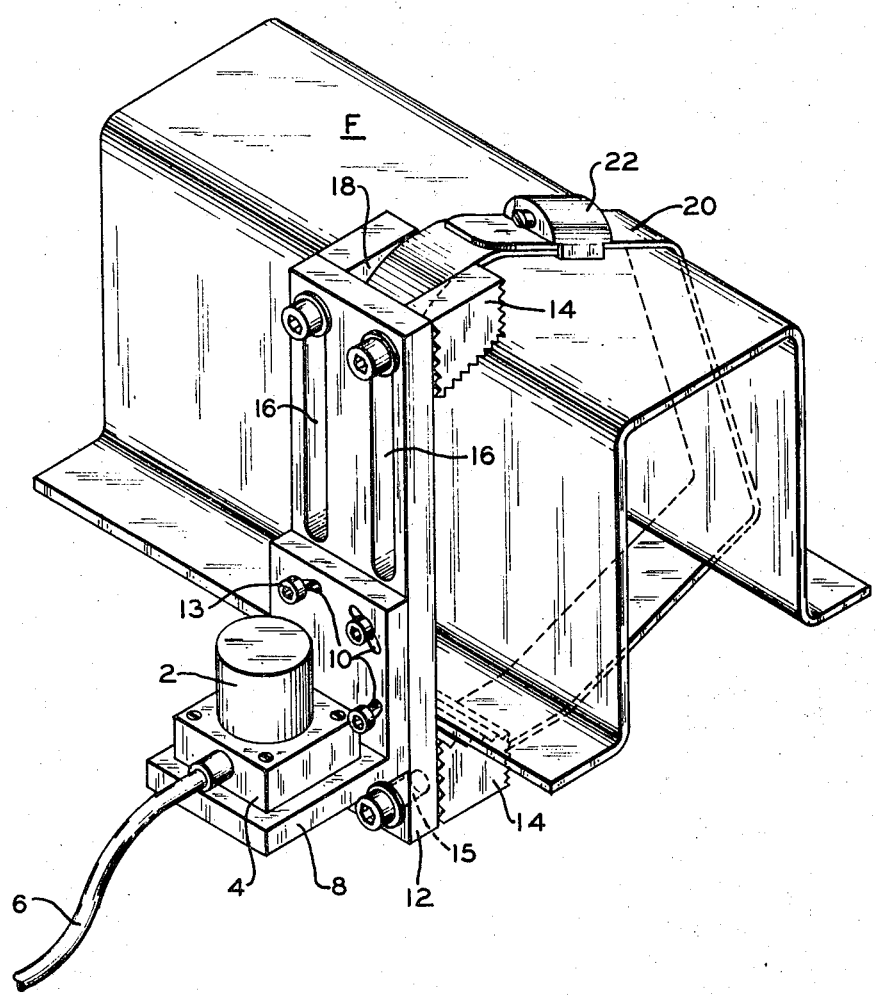
FIG. 1 is a perspective view of the inventive mounting device secured to the horizontal framework of an automobile.

The base member 12 of the illustrative mounting device is an elongated rectangular member which has a pair of holes 15 at one end and a pair of longitudinal slots 16 at its opposite end. Secured to the opposite side of the base member 12 from the angle member 8 is a pair of serrated hardened metal support blocks 14, one of which is fixedly secured by threaded members passing through the screw holes 15; whereas, the other member of the pair is adjustably secured to the base member by threaded members passing through the slots 16 and into the base member 12.

In the illustrative apparatus, each of the block members 14 is of irregular cross section and is serrated on three surfaces. Likewise, each of the block members have an integral slot 18 to receive a band 20 which has an adjustable clamping member 22.

The combination of the irregularly shaped blocks, the adjustability of the block separation, the multisurface serrations and the flexible strap make the illustrative mounting device extremely versatile as to the structures which are readily adapted as supports.

As seen in FIG. 1 the mounting device is secured to a frame member F having an uneven surface; i.e., not presenting a uniform surface. One of the support blocks 14 rests against the exterior of the channel portion whereas the other rests against an outwardly extending flange. The irregular shape of the blocks and the serrations allow the base member to be securely placed parallel to the surface of the frame structure, without cutting or otherwise modifying the frame and without modification of the mounting device.

Figure 2:
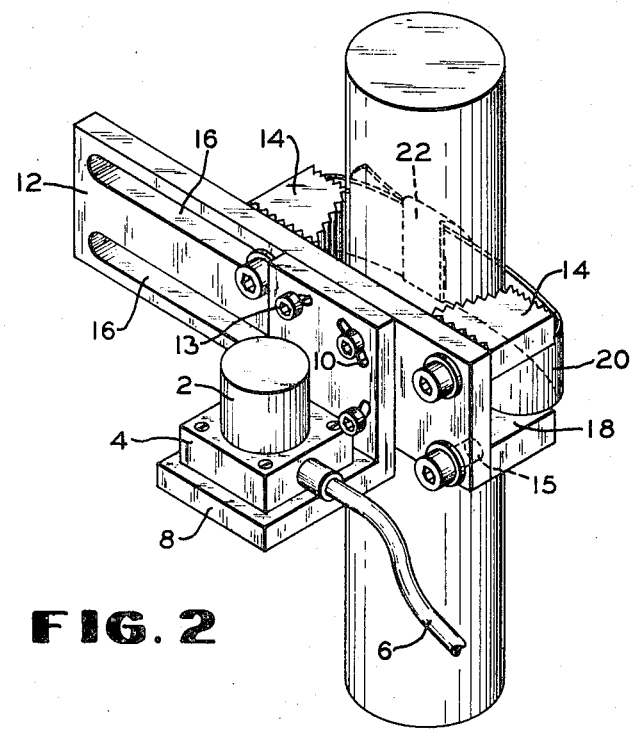
FIGS. 2 and 3 illustrate the manner the invention mounting device may be clamped to other illustrative structures either with or without the use of an angled member illustrating the versatility of the device.
Figure 3:
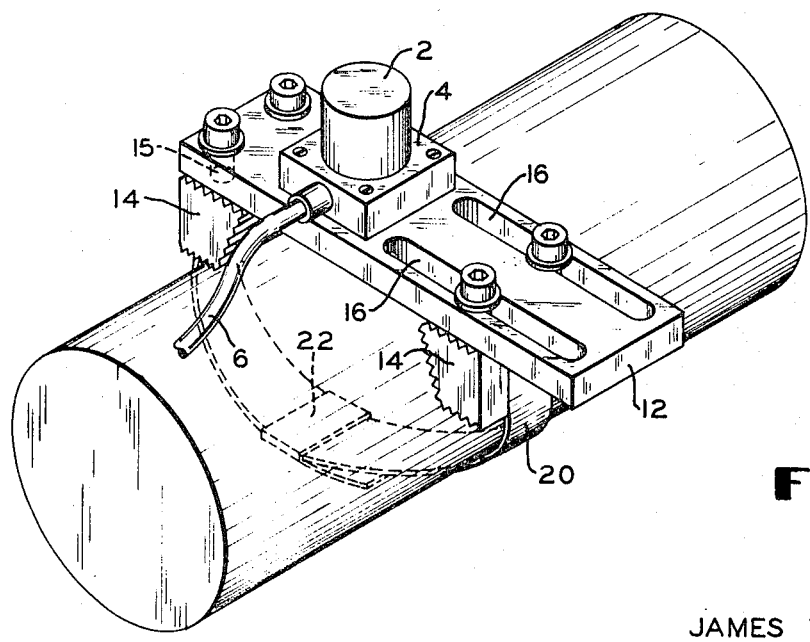

FIGS. 2 and 3 illustrate the use of the mounting device with support members of circular cross section, horizontally and vertically disposed. It is to be noted that the assembly shown in FIG. 2 utilizes the right angle member 8 whereas the assembly shown in FIG. 3 does not.

It will be apparent to the reader that the illustrative combination shown and described is extremely versatile as a mounting means and even with the shape of the support blocks as shown if the orientation were changed, could be used as a support on a concave surface.

While a specific embodiment of the present invention has been shown and described in detail, it will be understood that it is for the purpose of illustration only and not to be taken as limiting the scope of the invention, reference being had for this purpose to the appended claims.

I claim:

1. A mounting assembly for securing a device requiring specific orientation to a variety of supporting structures such as the framework of an automobile comprising a base plate for fixedly supporting the device on one of its surfaces, a pair of adjustably spaced mounting blocks removably secured to the base plate upon a different surface from the device, said mounting blocks having serrated, hardened surfaces adapted to engage said supporting structure, and clamping means for securing the mounting blocks to the supporting structure, said clamping means comprising a strap of adjustable length encircling said mounting blocks and supporting structure.

2. The mounting assembly of claim 1 wherein one of the mounting blocks is fixedly secured to the base plate and the other mounting block is adjustably secured to the base plate.

3. The mounting assembly of claim 1 wherein the serrated surfaces of said mounting blocks are disposed in aligned, opposed relationship to each other.